July 24, 1973    O. SCHNELLMANN    3,748,208
FILM SPLICING APPARATUS
Filed Sept. 28, 1971    6 Sheets-Sheet 1

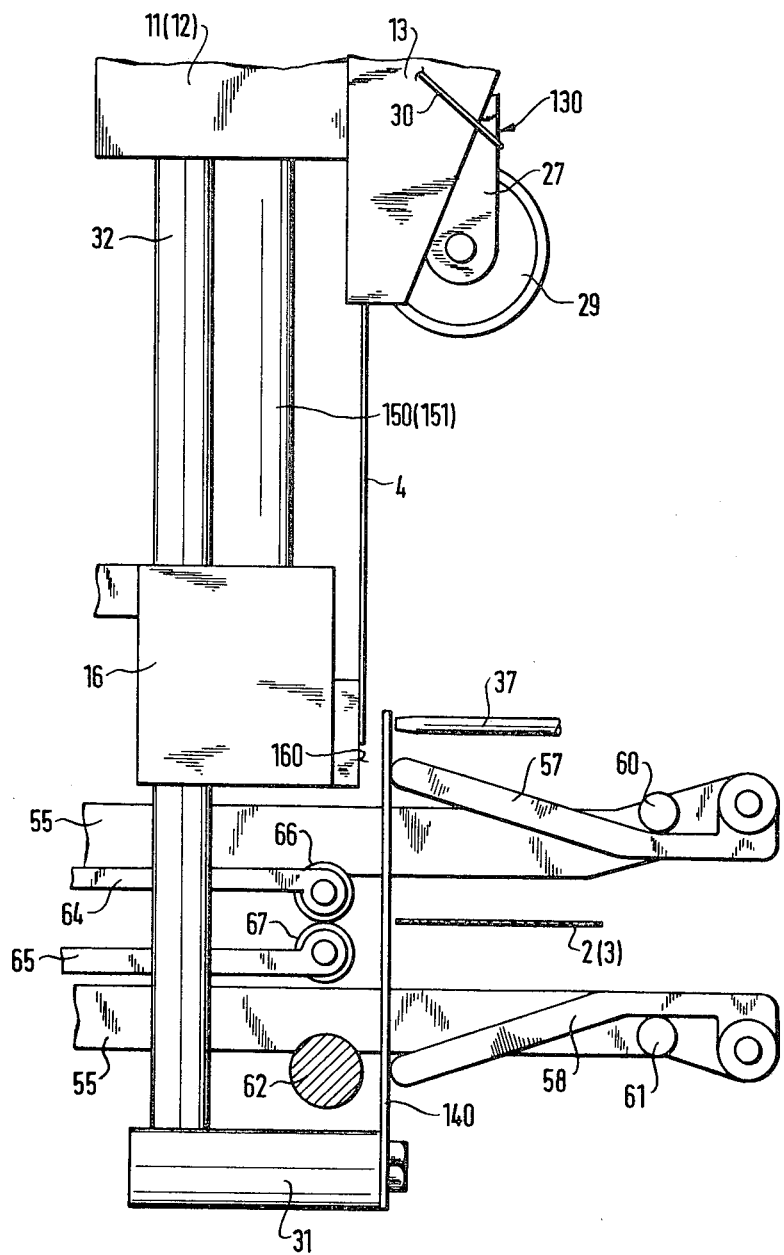

3,748,208
FILM SPLICING APPARATUS
Oskar Schnellmann, Zurich, Switzerland, assignor to Gretag Aktiengesellschaft, Regensdorf, Switzerland
Filed Sept. 28, 1971, Ser. No. 184,454
Claims priority, application Switzerland, Oct. 2, 1970, 14,623/70
Int. Cl. B31f *5/06;* G03d *15/04*
U.S. Cl. 156—443                                    7 Claims

ABSTRACT OF THE DISCLOSURE

A film splicer is provided with means for supporting end portions of two lengths of film strip in longitudinal alignment at a splicing station and with their ends abutting. A knife is disposed to cut off lengths of adhesive tape of the kind having a tacky side and a non-tacky side drawn from a tape supply. A transport mechanism is arranged to feed the forward end of a length of tape from the cutting knife along a path transverse to the longitudinal direction of the film strip over and past a first tape support surface with the non-tacky side turned theretowards, past the splicing station with the tacky side of the tape turned towards the film portions, and onward until the forward end of the tape makes contact with a second tape support surface beyond the splicing station and the length of tape spans a gap defined between the two tape support surfaces. A pair of tape engaging arms are disposed one on each side of the plane of the film strip at the splicing station. The arms are movable together generally towards the respective tape support surfaces to engage the tacky side of the length of tape when spanned across the gap between the tape support surfaces and are movable together away from said tape support surfaces. The ends of the tape engaging arms are arranged to perform a continuous closing motion towards each other during the return movement from the tape support surfaces and in such manner as to draw the length of tape adhering to the ends of the arms about the abutting end portions of the film strip commencing from one edge thereof. Wiper means are also provided, comprising a pair of wiper members biased towards each other and adapted for movement together with one member disposed on each side of the plane of the film strip. The wiper members are arranged to engage the film strip with the length of tape drawn thereabout and to smoothly press the tacky side of the tape against both surfaces of the film strip commencing from the aforementioned one edge and travelling progressively across the width of the film ends.

BACKGROUND OF THE INVENTION

Film splicers, comprising means for locating the ends of two lengths of film strip in longitudinal alignment with their ends abutting at a splicing station, and employing adhesive tape of the kind having a tacky side and a non-tacky side to form a splice or join between the abutting film ends, have been previously proposed.

The film splicer disclosed in U.S. Pat. No. 3,434,907 is of this type, and employs a tape feeding mechanism at one side of the splicing station to project the forward end of a length of tape in cantilever fashion transversely across the film end portions at the splicing station and into the catching grooves of a pair of arms, which are arranged to subsequently move in a manner to draw the forward end of the tape length round the underside of the abutting film end portions. In this prior art splicer wiper means are brought into engagement with the non-tacky side of the adhesive tape to press the tacky side against the film strip.

The method of feeding tape employed in this U.S. patent and the method of bringing the tape length into contact with the surfaces of the film end portions has not proved to be satisfactory.

It is an object of this invention to provide an improved film splicer in which a length of adhesive tape is drawn about the abutting end portions of the film strip at the splicing station from both sides of the film strip and commencing from one edge thereof.

It is a further object of this invention to provide a film splicer in which the tape is so drawn about the abutting end portions of the film strip by means which are both reliable in operation and simple in construction.

SUMMARY OF THE INVENTION

In accordance with this invention there is provided a film splicer comprising: means for supporting end portions of two lengths of film strip in longitudinal alignment at a splicing station and with their ends abutting;

a knife disposed to cut off lengths of adhesive tape of the kind having a tack side and a non-tacky side drawn from a tape supply;

a transport mechanism for feeding the forward end of a length of tape from the cutting knife along a path transverse to the longitudinal direction of the film strip over and past a first tape support surface with the non-tacky side turned theretowards, past the splicing station with the tacky side of the tape turned towards the film portions, and onward until the said forward end makes contact with a second tape support surface beyond the splicing station and said length of tape spans a gap defined between said tape support surfaces;

a pair of tape engaging arms disposed one on each side of the plane of the film strip at said splicing station, said arms being movable together generally towards the respective tape support surfaces to engage the tacky side of the length of tape when spanned across said gap and being movable together away from said tape support surfaces, the ends of the tape engaging arms being arranged to perform a continuous closing motion towards each other during said return movement from the tape support surfaces and in such manner as to draw the length of tape adhering to the ends of the arms about the abutting end portions of the film strip commencing from one edge thereof;

and wiper means comprising a pair of wiper members biased towards each other and adapted for movement together with one member disposed on each side of the plane of the film strip, the wiper members being arranged to engage the film strip with the length of tape drawn thereabout and to smoothly press the tacky side of the tape against both surfaces of the film strip commencing from said one edge and travelling progressively across the width of the film.

Preferably the tape engaging arms are mounted on a common carriage by pivotal connections allowing rotation of the arms generally towards and away from each other, each arm being formed with a follower surface cooperating with a respective fixed abutment or cam to cause the ends of the arms to close towards each other as the carriage is moved in a direction to withdraw the arms from the tape support surfaces.

In a preferred form of film splicer in accordance with this invention, the carriage comprises a pair of similar elongate arm support members joined on the side of the tape path away from the splicing station and disposed one on each side of the plane of the film strip at the splicing station, the arms extending backwardly from their respective pivot connections with the arm support members towards the tape path. In this preferred embodiment all the construction elements of the splicer may be placed on one longitudinal side of a guide for the abutting film ends, leaving the other longitudinal side free for manipulation of the film strip.

BRIEF DESCRIPTION OF THE DRAWINGS

FIG. 7 is another partial side view showing another phase of operation of the splicer.

DESCRIPTION OF THE PREFERRED EMBODIMENT

Figure 1:
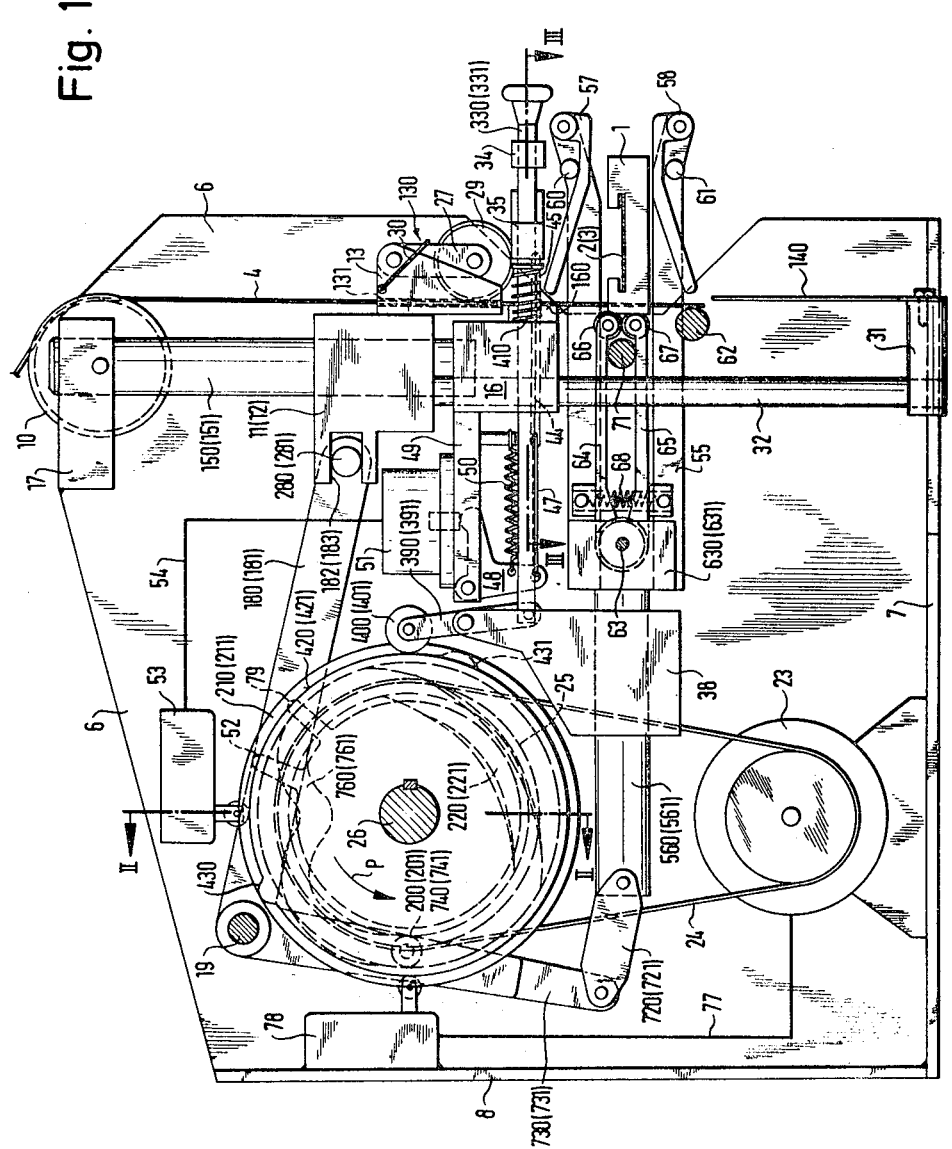
FIG. 1 shows a side elevational view of a preferred embodiment of film splicer constructed in accordance with this invention and with one casing side wall removed.

Referring to FIG. 1 of the drawings, the film splicer comprises a film guide 1 arranged to support end portions 2, 3 of two lengths of film strip in longitudinal alignment at a splicing station and with their ends abutting. Film guide 1 is rigidly secured to a frame of the splicer, which frame includes a casing formed by two side plates 5 and 6, a bottom plate 7 and a rear wall 8. The casing is open at the top and at the front, and so that the internal details of the splicer may be apparent, one of the side plates 5 has been omitted from FIG. 1, but may be seen in a section in FIG. 2. As will become more apparent from the following description, the splicer also includes a knife 45 disposed to cut off lengths of adhesive tape of the kind having a tacky side and a non-tacky side drawn from a tape supply (not shown). A transport mechanism including two synchronously reciprocable tape entraining devices 130 and 140 is provided for feeding lengths of the adhesive tape. As will be explained below, the tape is engaged by a pair of arms 57 and 58 which are arranged to draw a length of tape adhering to the ends of the arms about the abutting end portions 2 and 3 of the film strip at the splicing station, and the splicer also includes wiper means for smoothly pressing the tape against the film strip surfaces to complete the splice.

Figure 4:
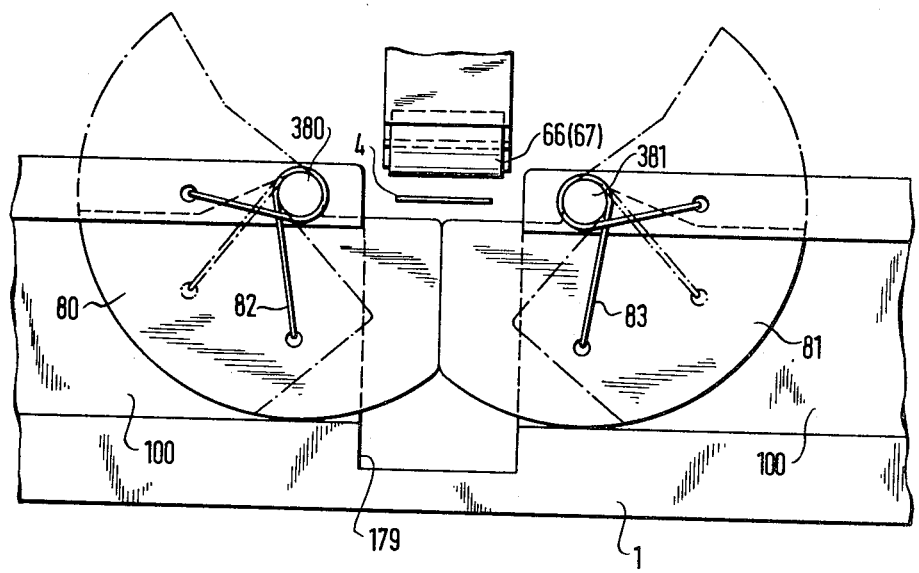
FIG. 4 is a partial top plan view showing the film support surfaces at the splicing station.

Referring to FIGS. 1 and 4, the film guide 1 is grooved to receive the longitudinal marginal edges of the two end portions of the lengths of film strip. At the splicing station the guide 1 is formed with a recess 179 for which bridging means are provided. FIG. 4 shows a preferred form of bridging means in detail. As can be seen, the bridging means comprises a pair of disc-like plates 80 and 81 rotatable about respective spindles 380 and 381 let into film support surface 100 of film guide 1 on opposite sides of the recess 179. The plates 80 and 81 are spring biased towards each other by respective springs 82 and 83 to bridge the recess 179. Elements of the splicer such as the wiper means 66 and 67 are enabled to readily pivot the plates 80 and 81 of the bridging means apart one from another into the positions indicated in FIG. 4 by chain-dotted lines. It will be appreciated that means for winding on a film strip, and for bringing end portions of the two lengths of strip into longitudinal alignment with their ends abutting could well be provided in association with film guide 1. However, such means are well known to those skilled in this art and do not form a part of the present invention. It is therefore deemed unnecessary to describe or illustrate such means in the present specification.

The tape transport mechanism 130, 140 is arranged to draw adhesive tape 4 stepwise from a supply reel (not shown) by way of a deflecting roller 10. Tape entraining device 130 together with its casing 13 is directly secured to a movable support 12. In the illustrated embodiment, tape entraining means 140 comprises a spring strip or the like which is secured by way of an angle member formed of two components 31 and 32 to a second movable support 11. The two supports 11 and 12 are mounted for axial movement along respective rods 150 and 151. In the view of FIG. 1, support 12 and rod 151 are respectively masked by support 11 and rod 150. In general the masking of an integer by an integer of similar shape and configuration is indicated in the drawings by placing the reference numeral of the masked integer in brackets. The movable supports 11 and 12 are respectively interconnected with discs 210 and 211 (mounted for rotation with a shaft 26) by way of respective bell cranks 180 and 181. The bell cranks 180 and 181 are pivotally mounted on a common spindle 19. The ends of the bell cranks 180 and 181 remote from the discs 210 and 211 respectively are provided with pins 280 and 281 constrained to slide in respective slots 182 and 183 provided in the movable supports 11 and 12 respectively. Rotatably mounted in the other arms of the respective bell cranks 180 and 181 are rollers 200 and 201 which are constrained to act as followers sliding in respective grooves 220 and 221 provided on the faces of disc 210 and 211 respectively. The shapes defined by the grooves 220, 221 are flattened circles.

Figure 2:
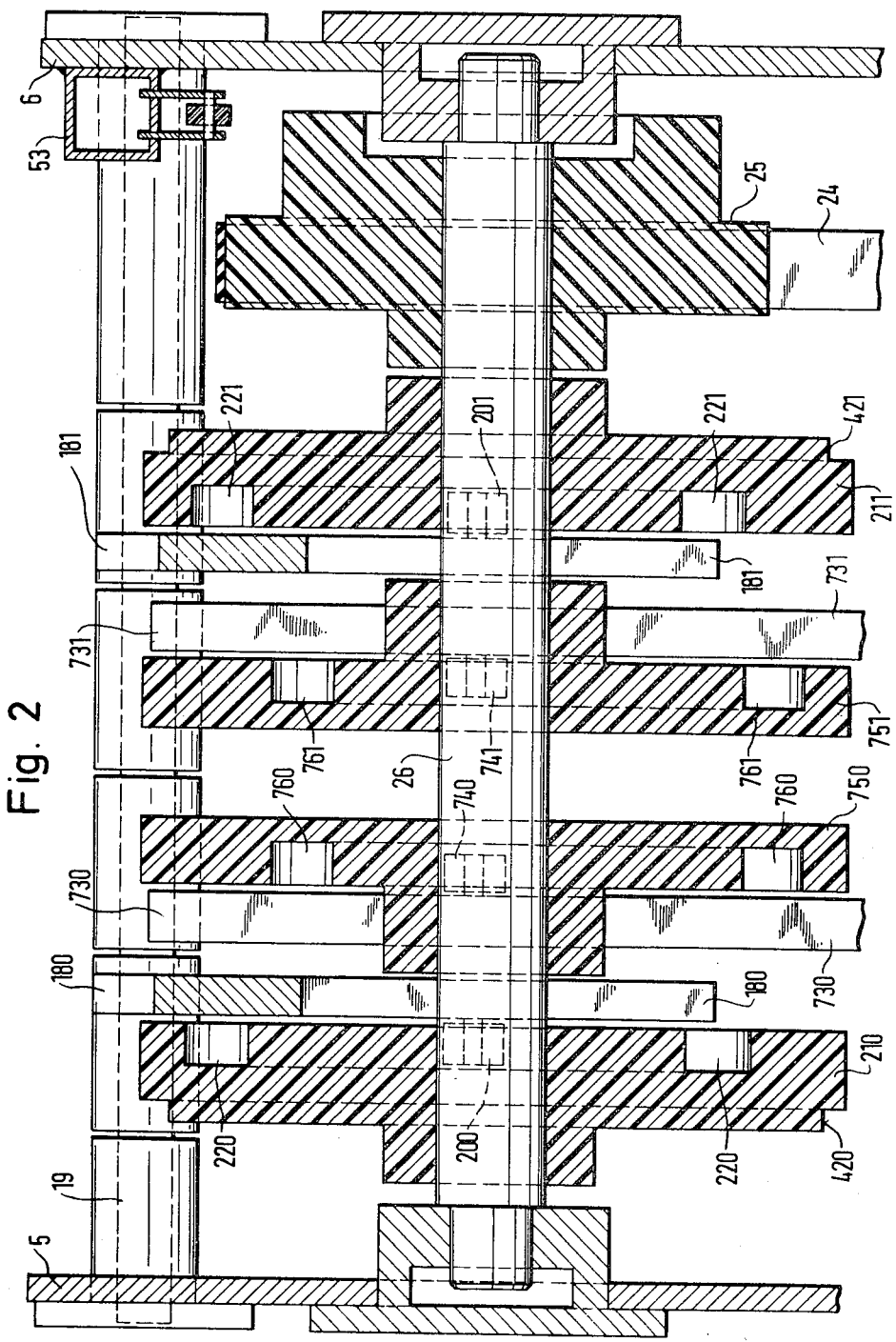
FIG. 2 is a sectional view taken on the line II—II of FIG. 1.

Referring to FIGS. 1 and 2, discs 210 and 211 comprise two of a plurality of discs mounted for rotation with shaft 26. The shaft 26 rotates in bearings provided in the frame of the splicer and is provided with a pulley 25 arranged to be driven via a belt 24 from a motor 23. The two discs 210 and 211 are so disposed on shaft 26 that their respective grooves 220 and 221 are substantially in registration with one another; consequently, the two supports 11 and 12 are caused to rise synchronously as the shaft 26 rotates. The grooves 220 and 221 are so shaped that the stroke or reciprocation of support 11 is slightly in excess of that of support 12, for a reason to be explained.

Tape entraining device 130 includes a surface 131 over which the adhesive tape is guided and against which a knurled or toothed periphery of a roller 29 mounted on a pivoted lever 27 is pressed by a spring 30. The roller 29 is free to rotate anti-clockwise (as seen in FIG. 1) but is prevented from rotating in the opposite sense. Consequently, roller 29 and guide surface 131 are adapted to apply tension to the tape only during the downward stroke of the device 130 (during which stroke the roller 29 is locked). Consequently, tape entraining device 130 advances the tape in steps. In its extreme uppermost position, the spring strip 140 has its distal extremity above the level of the knife 45.

Figure 3:
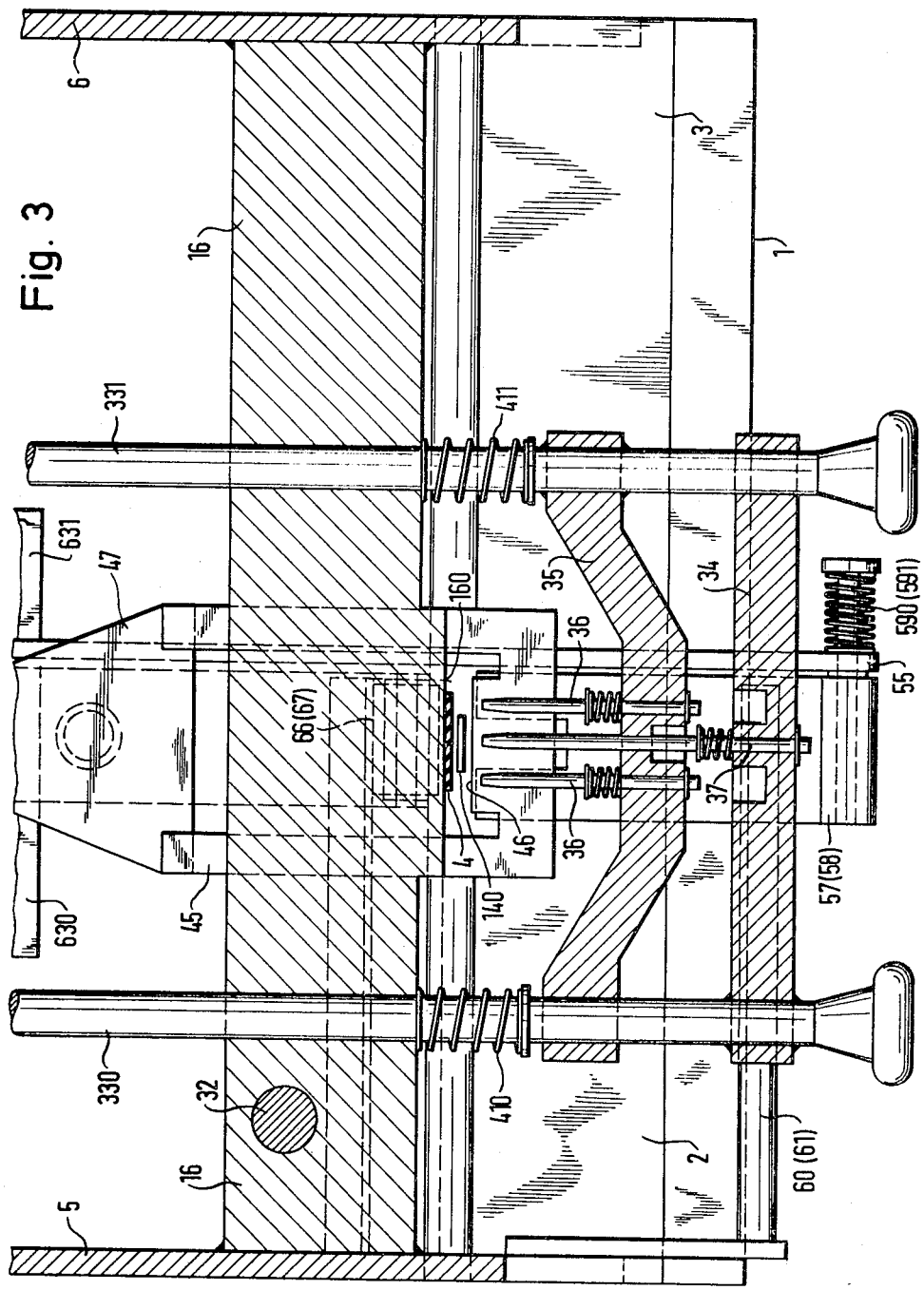
FIG. 3 is a sectional view taken on the line III—III of FIG. 1.

Referring to FIG. 1, the rods 150 and 151 each have their lower end secured in a guide block 16 which is in turn rigidly secured to the frame of the splicer (as shown in FIG. 3). FIG. 3 also shows a pair of parallelly disposed rods 330 and 331 interconnected by webs 34 and 35 and mounted for horizontal movement in block 16. Rod 330 is rigidly connected to web 34 but can move axially relative to web 35, while rod 331 can move axially relative to web 34 but is rigidly connected to web 35. Two pins 36 which extend towards the tape path in the region of a tape support surface 160 are resiliently mounted in the web 35. A pin 37 is resiliently mounted in web 34 and also extends towards the tape path in the region of tape support surface 160, but (as shown in FIG. 3) towards that part of the tape path adjacent which the spring strip 140 is disposed in its uppermost position. The rods 330 and 331 respectively are interconnected by means of pivoted levers 390 and 391 with respective curved guideways 420 and 421 provided on the edges of discs 210 and 211 respectively The pivoted levers 390 and 391 carry respective rollers 400 and 401 which are arranged to act as followers in the guideways 420 and 421 respectively. Contact pressure between the rollers 400 and 401 and their respective guideways 420 and 421 is ensured by means of respective compression springs 410 and 411 about the respective rods 330 and 331 (see FIG. 3). It will be clear from FIG. 2 that the guideways 420 and 421 are formed by cutting back edges of the discs 210 and 211. In each guideway there is provided a cam 430, 431 respectively (see FIG. 1). When the respective follower such as roller 400 reaches its respective cam 430 in its guideway 420, the respective lever 390 is caused to pivot and thereby move rod 330 to the left in FIG. 1. It will be seen from FIG. 3 that this will cause movement of web 34 and hence also pin 37 towards the tape support surface 160. Similarly, when follower 401 reaches its respective cam 431 in groove 421, the pins 36 are caused to move towards the tape support surface 160.

Referring to FIG. 3, the tape cutting knife 45 is of generally U-shaped configuration having a pair of substantially parallel elongate arms mounted for horizontal movement in the guide block 16 and a bight portion formed at its inwardly directed edge with a cutting blade 46. The arms of knife 45 are connected by means of a spring strip 47 to a bell crank 48 (see FIG. 1) which is arranged to be pivoted against the bias of a tension spring 50 by an electromagnetic actuator 51. The actuator 51 is associated via a line 54 with a microswitch 53 which is arranged to be closed briefly once in each revolution of pulley 25 by a cam 52. At each such "make" the actuator 51 acts via bell crank 48 to pull the knife 45 to the left (as seen in FIG. 1) from the illustrated position so that the blade 46 cuts through the tape 4 whereafter spring 50 is arranged to restore the knife 45 to its normal inoperative position shown in FIG. 1.

The pair of tape engaging arms 57 and 58 will be seen from FIG. 1 to lie one on each side of the plane of the film strip 2,3 at the splicing station. The arms 57 and 58 are mounted for movement on a common carriage 55 which comprises a pair of similar elongate arm support members one being disposed above the plane of the film strip 2,3 and the other being disposed below the plane of the film strip 2,3 at the splicing station. The two arm support members of the carriage 55 are joined on the side of the tape path away from the splicing station by a block 631 which is mounted to a rod 561 arranged for movement in a guide 38 rigidly secured to the frame of the splicer. The rod 561 is arranged to be driven by way of a two-piece articulated lever 721, 731 from a roller follower 741 captured in a groove 761 provided in a further disc 751 mounted for rotation with the shaft 26 (see FIG. 2). Groove 761 has the shape of a cardioid about the axis of shaft 26 so that the carriage 55 is constrained to reciprocate horizontally with a cardioid pattern of movement.

The tape engaging arms 57 and 58 are mounted on their common carriage 55 by pivotal connections allowing rotation of the arms generally towards and away from each other. Each arm is formed with a follower surface which is biased towards a respective fixed abutment or cam 60, 61 by respective torsion springs 590 and 591. As will be apparent from FIGS. 1 and 6, the follower surfaces of the arms 57 and 58 are so shaped that as the carriage is drawn to the right (or in a direction to withdraw the arms 57 and 58 from the tape path), the arms are arranged to perform a continuous closing motion towards each other. The reverse movement to the left will result in an opening motion.

The wiper means for smoothly pressing the tape about the end portions of the film strip to complete the splice comprise a pair of wiper members 66 and 67, in the form of rollers, mounted at the respective ends of a pair of levers 64 and 65 pivotable about a common spindle axis 63 and biased together in a tongs-like fashion by a tension spring 68. The spindle 63 is mounted in a block 630 to which is mounted a rod 560 which is also displaceable in guide 38. The rod 560 is arranged to be driven via an articulated lever 720, 730 (which is pivoted at its upper end on spindle 19) from a follower roller 740 captured in a groove 760 in a further disc 750 mounted on shaft 26 for rotation therewith. The configuration of groove 760 is substantially similar to the cardioid shape of groove 761, and the grooves 760 and 761 substantially coincide. The wiper levers 64 and 65 are guided in their travel by means of an abutment 71 rigidly secured to the frame of the splicer so that the wiper rollers 66 and 67 are guided to engage the film strip from both sides thereof at the splicing station.

Figure 5:
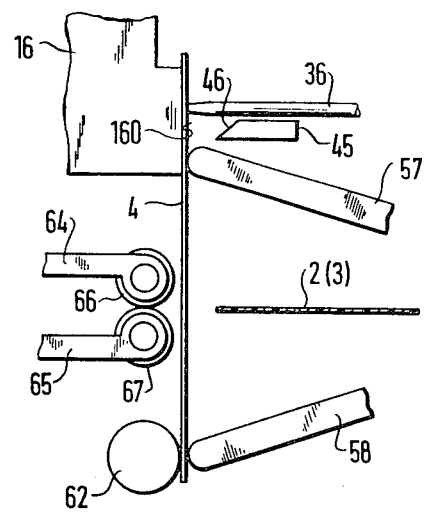
FIGS. 5 and 6 show partial side views similar to FIG. 1 with parts omitted to illustrate subsequent stages of operation of the splicer.

The ends of the tape engaging arms 57 and 58 are rounded and are arranged (as seen in FIG. 5) to press the adhesive tape 4 simultaneously against a pair of abutments or tape support surfaces between which the tape is spanned. One such tape support surface comprises a plain surface 160 formed on the guide block 16 and the other tape support surface comprises the peripheral surface of a cylinder 62 rigidly secured to the frame of the splicer. The tape 4 is advanced with its non-tacky side turned towards the tape support surfaces and with its tacky side turned towards the splicing station and the tape engaging arms 57 and 58. Consequently, in the position illustrated in FIG. 5, the length of tape 4 becomes adhered to the ends of the arms 57 and 58. If the length of tape is cut by the blade 46 of knife 45 at the time of engagement of the arms 57 and 58 with the tape, during the subsequent withdrawal of the arms 57 and 58 to the right, the cut length of tape will be carried with the arms. As the arms move to the right and are closed towards each other, the length of tape will be drawn about the abutting end portions of the film strip commencing from one edge thereof. The V-like shape defined by the tape and the ends of the arms 57 and 58 has an angle which steadily diminishes as the length of tape is drawn about the film ends. During this same motion, the wiper rollers 66 and 67 are arranged to engage the film strip with the length of tape drawn thereabout from both sides and to smoothly press the tacky sides of the tape against both surfaces of the film strip commencing from one edge and travelling progressively across the width of the film.

A microswitch 78 mounted on the rear wall 8 of the casing is connected to motor 23 via a line 77 and is arranged to be operated by a cam 79 provided on pulley 25. Cam 79 is adapted to operate microswitch 78 after each splicing operation when the carriage 55 (with tape engaging arms 57 and 58) and the wiper means 64 to 67 have returned to their respective normal or inoperative positions shown in FIG. 1. This operation of microswitch 78 initiates an "end-of-cycle" signal which causes shaft 26 to cease to rotate. A switch (not shown) is provided for initiating a further splicing operation. FIGS. 1 to 3 show the tape transport mechanism immediately after a tape feeding stroke has been performed. It will be seen that the forward end of a length of tape has been fed from the position of the cutting knife 45 along a path transverse to the longitudinal direction of the film strip, over and past the first tape support surface 160 with the non-tacky side of the tape turned theretowards, generally past the splicing station with the tacky side of the tape turned towards the film portions, and onward until the forward end of the tape has made contact with the second tape support surface 62. In this condition, the length of tape spans a gap defined between the two tape support surfaces 160 and 62. Upon further rotation of shaft 26 in the direction indicated by an arrow P, cam 431 abuts roller 401 so that pivoted lever 391 moves rod 331 to the left carrying with it web 35. As a result of this motion, the two pins 36 mounted in web 35 press the tape 4 against surface 160 for as long as roller 401 runs over its cam 431. Simultaneously, roller 741 mounted on lever 731 encounters in its respective groove 761 a track portion so shaped that rod 561 and therefore carriage 55 moves to the left, bringing the ends of the tape engaging arms 57 and 58 towards the tape 4 to make contact simultaneously against the portions of the tape resting on tape support surfaces 160 and 62. The tape 4 becomes adhered to the free ends of tape engaging arms 57 and 58, and the tape is held against tape support surface 160 both above and below the position of knife 45 (see FIG. 5). Whilst the tape 4 is so held against tape support surface 160, knife 45 is actuated via line 54, actuator 51 and bell crank 48 to sever the tape 4. Spring 50 automatically returns knife 45 to its normal inoperative position immediately after such tape severance.

Figure 6:
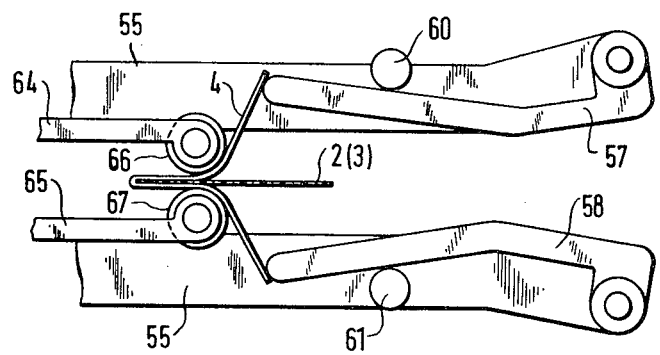

As the shaft 26 continues to rotate follower roller 401 disengages from cam 431 so that rod 331, web 35 and pins 36 are moved away from tape 4 under the action of the spring 411. As shaft 26 continues to rotate, the rollers 740 and 741 enter respective concavities in their guideways causing rods 560 and 561 to move to the right through the agency of their respective articulated levers 720, 730 and 721, 731. As a result, carriage 55 and its associated tape engaging arms 57 and 58 and block 630 with the associated wiper means 64 to 67 move transversely of the film strip at the splicing station from left to right as shown in FIGS. 1, 5 and 6. During this motion the pivoted bridging plates 80 and 81 of FIG. 4 are pushed out of the way to expose the abutting end portions 2 and 3 of the film strip over the recess 179. By virtue of their continuous closing motion towards each other the tape engaging arms 57 and 58 draw the length of tape adhering to their ends about the abutting portions of the film strip commencing from one edge thereof. The wiper rollers 66 and 67 mounted at the ends of their respective tong-like levers 64 and 65 follow shortly after the tape engaging arms 57 and 58 (as shown in FIG. 6) to engage the film strip from both sides with the length of tape drawn thereabout to smoothly press the tacky sides of the tape against both surfaces of the film strip commencing from the said one edge and travelling progressively across the width of the film. The tape transport mechanism is arranged so that the length of tape 4 used in each splicing operation is not quite sufficient to extend over the whole width of the film. The operative distances of reciprocation of the carriage 55 and arms 57 and 58 on the one hand and block 630 and wiper means 64 to 67 on the other hand are extended further than necessary to apply a piece of adhesive tape of exactly the correct length, thus, ensuring that in each splicing operation the whole of the particular length of tape is smoothed onto the film strip. After such application of the tape about the abutting end portions of the film strip, the wiper means 64 to 67 and the tape engaging arms 57 and 58 move transversely backwards to the left over and past the splicing station to return to the normal inoperative position illustrated in FIG. 1.

As shaft 26 continues to rotate, cam 79 operates microswitch 78 which triggers an end-of-cycle signal via line 77 to motor 23 so that rotation of the shaft 26 ceases. To initiate a further splicing operation, shaft 26 is started e.g. by operation of a swich (unillustrated) whereafter, upon further rotation of shaft 26, roller 200 in groove 220 and roller 201 in groove 221 move through the flattened parts of their paths so that the tape entraining devices 130 and 140 of the tape transport mechanism are caused to move first upwardly and then downwardly. During the upwards movement the knurled or toothed roller 29 of tape entraining device 130 rotates freely on the tape 4. When the two devices 130 and 140 are at their uppermost positions, cam 430 abuts roller 401 so that rod 330 together with web 34 and the associated pin 37 are caused to move through the agency of lever 390 towards the right in FIG. 1. At this stage of operation, the spring strip of tape entraining device 140 has its distal extremity in confronting relation to tape support surface 160. Movement of pin 37 to the right in FIG. 7 causes the distal extremity of the strip to be brought into facial contact with the tacky side of adhesive tape 4 at its forward end. Pin 37 is then withdrawn and the two tape entraining devices 130 and 140 are caused to move simultaneously downwards. The stroke or distance of reciprocation of tape entraining device 140 is slightly in excess of that of tape entraining device 130, so that when device 130 has reached its lowermost position tape entraining device 140 moves slightly further down and therefore becomes disengaged from tape 4. This is the condition illustrated in FIGS. 1 to 3, from which condition the tape engaging arms 57 and 58 can be moved to the left to perform a further splicing operation as described hereinabove.

What is claimed is:

1. A film splicer comprising: means for supporting end portions of two lengths of film strip in longitudinal alignment at a splicing station and with their ends abutting;

a knife disposed to cut off lengths of adhesive tape of the kind having a tacky side and a non-tacky side drawn from a tape supply;

a transport mechanism for feeding the forward end of a length of tape from the cutting knife along a path transverse to the longitudinal direction of the film portions over and past a first tape support surface with the non-tacky side turned theretowards, past the splicing station with the tacky side of the tape turned towards the film portions, and onward until the said forward end makes contact with a second tape support surface beyond the splicing station and said length of tape spans a gap defined between said tape support surfaces;

a pair of tape engaging arms disposed one on each side of the plane of the film strip at said splicing station, said arms being movable together generally towards the respective tape support surfaces to engage the tacky side of the length of tape when spanned across said gap and being movable together away from said tape support surfaces, the ends of the tape engaging arms being arranged to perform a continuous closing motion towards each other during said return movement from the tape support surfaces and in such manner as to draw the length of tape adhering to the ends of the arms about the abutting end portions of the film portions commencing from one edge thereof;

and wiper means comprising a pair of wiper members biased towards each other and adapted for movement together with one member disposed on each side of the plane of the film portions, the wiper members being arranged to engage the film portions with the length of tape drawn thereabout and to smoothly press the tacky side of the tape against both surfaces of the film portions commencing from said one edge and travelling progressively across the width of the films.

2. A film splicer according to claim 1, wherein the tape engaging arms are mounted on a common carriage by pivotal connections allowing rotation of the arms generally towards and away from each other, each arm being formed with a follower surface cooperating with a respective fixed abutment to cause the ends of the arms to close towards each other as the carriage is moved in a direction to withdraw the arms from the tape support surfaces.

3. A film splicer according to claim 2, wherein said carriage comprises a pair of similar elongate arm support members joined on the side of the tape path away from the splicing station and disposed one on each side of the plane of the film portions at the splicing station, the arms extending backwardly from their respective pivot connections with the arm support members towards the tape path.

4. A film splicer according to claim 1, wherein the transport mechanism comprises two synchronously reciprocable tape entraining devices, and means for causing one of said tape entraining devices to engage the tape at the forward end thereof, the other of said tape entraining devices being adapted to engage the tape at a distance from such forward end which is at least twice the width of the film portions; said one tape entraining device comprising a spring strip with its distal extremity disposed on the tape path and directed generally towards the other tape entraining device; the engagement causing means comprising a member adapted to bend said strip sufficiently when located at its forwardmost position to bring the distal extremity of the strip into facial contact with the tacky side of the forward end of the adhesive tape; and wherein the distance of reciprocation of said one tape entraining device is slightly greater than that of the other tape entraining device so that near the end of the feeding movement of the tape the spring strip disengages from the adhesive tape while it is still retained by the other tape entraining device.

5. A film splicer according to claim 1, wherein the film supporting means at the splicing station comprises a film support surface provided with a recess in the region of the abutting film ends and means arranged to bridge said recess to effectively provide a continuous film support surface, the bridging means being adapted to be retracted to expose the recess during drawing of the adhesive tape about the film end portions.

6. A film splicer according to claim 5, wherein the bridging means is arranged to be retracted against the force of a return spring to expose the recess.

7. A film splicer according to claim 6, wherein the bridging means comprise a pair of similar pivotally mounted plates disposed symmetrically of the recess and biased towards each other by respective springs.

References Cited
UNITED STATES PATENTS

| | | | |
|---|---|---|---|
| 3,011,936 | 12/1961 | Baumbach et al. | 156—506 X |
| 3,050,107 | 8/1962 | Barry et al. | 156—506 X |

FOREIGN PATENTS

| | | | |
|---|---|---|---|
| 378,160 | 7/1964 | Switzerland | 156—545 |

PHILIP DIER, Primary Examiner

U.S. Cl. X.R.

156—506, 545, 510, 582